Patented June 1, 1943

2,320,704

UNITED STATES PATENT OFFICE 2,320,704

SPINNING OF SOLUTIONS OF CELLULOSE DERIVATIVES

Siegfried Petersen, Leverkusen Schlebusch, and Paul Schlack, Berlin Treptow, Germany; vested in the Alien Property Custodian No Drawing. Application July 1, 1941, Serial No. 400,714. In Germany June 6, 1940

12 Claims. (Cl. 18—54)

The present invention relates to improvements in the spinning of solutions in organic solvents of cellulose derivatives.

Cellulose esters and cellulose ethers, i. e. those cellulose derivatives which are soluble in organic solvents, and in particular lower cellulose esters such as cellulose acetate, propionate or butyrate or mixed esters of these acids are largely employed as starting materials for the preparation of threads, fibers, ribbons, foils, films and the like. The shaping is mostly effected by the so-called dry- or wet-spinning processes. In accordance with our present invention, shaped articles of the character described can be improved as to the stability towards organic solvents, towards water and towards heat by incorporating within the solutions in organic solvents of the said cellulose derivatives certain auxiliary agents which if exposed to a higher temperature effect the formation of a network between the cellulose derivatives thus increasing the molecular weight thereof. In accordance therewith, our new process essentially comprises the combination of the following steps: Auxiliary agents of the character set forth below are dissolved in solutions in organic solvents of such cellulose derivatives of the character described as contain free hydroxyl groups prior to the spinning thereof, the solutions are spun either according to the wet-spinning or the dry-spinning process and the spun materials prepared therefrom are exposed to a temperature at which reaction between the said cellulose derivatives and the said auxiliary agents occurs. As a modification, the dry-spinning process can be performed in such a manner that the temperature to which the mixture of the said materials is exposed after having left the spinning nozzle is sufficiently high as to effect evaporation of the solvents and simultaneously reaction between the starting materials. At any rate, preference is given to the dry-spinning process.

Suitable auxiliary agents of the character described are such derivatives of organic diisocyanates as, if exposed to a higher temperature of up to about 200° C., to react like diisocyanates themselves. There can be worked, for instance, with the corresponding bis-arylurethanes, such as the phenyl compounds, as such esters are liable to split off the phenol at a relatively low temperature. The reaction occurring upon the action of such bis-arylurethanes with a cellulose derivative containing free hydroxy groups may be regarded as a re-esterification, the phenol being split off and replaced in the urethane by the high molecular hydroxy compound. Instead of phenols, there may be employed for such bis-urethanes certain aliphatic alcohols such as an alcohol of the following constitution:

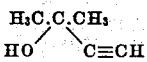

Still more importance is to be attached to those diisocyanate derivatives which are obtainable by reaction thereof with compounds containing an activated methylene group, i. e. a methylene group which owing to the neighbourhood of a —CO— group shows an increased reactivity. Diisocyanates, if caused to react upon the sodium derivatives of such methylene compounds in the presence of ether, are quickly converted into additional compounds therewith which are liable to regenerate the diisocyanate at a higher temperature, the radical of the methylene compound being mostly split up into smaller molecules. Examples for such compounds containing an activated methylene group are malonic acid esters, aceto-acetic acid esters or acetyl acetone. For clarity's sake, we are giving in the following the formula which is assumed for such an addition product of a diisocyanate and a malonic acid ester:

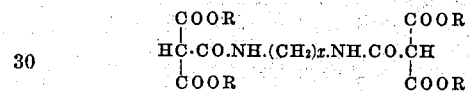

Diisocyanate derivatives of the character described are preferred to the diisocyanates themselves in case the solutions are to be stored in an unchanged state for a longer time. Amongst the diisocyanate derivatives of the character described, we prefer those addition products with methylene compounds of the type specified above which are split up into diisocyanates and small molecules such as carbon dioxide, alcohols etc. which owing to their high volatility are easily removed from the spun materials. The diisocyanates from which such derivatives are derived are preferably of the aliphatic or aromatic series. Among the former, there have proved to be suitable, for instance, the butane-, pentane-, hexane- and octane-ω-ω'-diisocyanates. The presence of substituents, such as alkyl groups, is not excluded. As example for a cycloaliphatic diisocyanate, there may be mentioned the cyclohexyl-1,4-diisocyanate. As aromatic diisocyanates, there have proved to be particularly suitable those of the benzene and diphenyl series. Examples for such compounds are the phenylen-1,4-, the 1-chloro-phenylen-2,4-, the diphenyl- 4.4'-, the 3.3'-dimethyldiphenyl-4.4'- and the 3.3'-dimethoxydiphenyl-4.4'-diisocyanates. As a matter of fact, the carbon chains between the isocyanate groups may be interrupted by hetero atoms such as oxygen or sulfur or by hetero groups such as carbonamide groups.

The amount of such diisocyanate derivatives depends on the desired effect. In general, an amount of about 3–20%, calculated on the amount of the cellulose derivative, has proved to be suitable for the purpose in question. The reaction temperature is preferably up to about 200° C.

Our invention is furthermore illustrated by the following examples without, however, being restricted thereto, the parts being by weight:

Example 1

In a solution of 30 parts of a partly saponified acetylcellulose in 70 parts of a mixture of acetone and ethylalcohol (85:15) there are dissolved 3 parts of bis-(methane-tricarboxylic acid-diethylester)-hexamethylene-1.6-diamide. The solution is spun according to the dry-spinning process, i. e. by conducting the spun articles after having left the spinning nozzle through a channel which is heated to 70–100° C. After evaporation of the solvent the spun articles are heated for about half an hour to two hours to 150–160° C. At this temperature, reaction between the acetylcellulose and the diisocyanate derivative occurs, the acetylcellulose being improved by this aftertreatment in its fastness to solvents, water and heat.

Bis-(methane-tricarboxylic-acid-diethylester)-hexamethylene-1.6-diamide (melting point 121–123° C.) is prepared by causing to react 1 mol of hexane-1.6-diisocyanate with 2 mols of sodium-malonic acid ester in an ethereal suspension and by neutralizing the sodium compound thus obtained with acetic acid. In the same manner, there can be prepared and employed in the above process the addition products from 1 mol of hexane-1.6-diisocyanate+2 mols of malonic acid methylester (melting point: 126–127° C.), of the same diisocyanate or +2 mols of malonic acid isopropylester (melting point: 118–119° C.) or of 1 mol of toluylenediisocyanate+2 mols of malonic acid methylester (melting point 127–128° C.). All these addition products are split up into diisocyanates at a temperature of about 120–150° C.

Example 2

In the above example the cellulose acetate can be replaced with equal success by the same amount of cellulose propionate or cellulose acetobutyrate dissolved in tetrahydrofurane.

Example 3

A solution of 3 parts of bis-(acetyl-malonic-acid-ethylester)-hexamethylene-1.6-diamide in 7 parts of tetrahydrofurane is added to a solution of 30 parts of a partly saponified acetylcellulose in 60 parts of tetrahydrofurane. After having left the spinning nozzle, the thread is precipitated by conducting it through a bath of a 10% aqueous sodium sulfate solution. Thereupon, it is dried for some time at 90–100° C. and then heated to 150–160° C. The more complete the reaction is, the less soluble is the thread in acetone.

Bis-(acetyl-malonic-acid-ethylester)-hexamethylene-1.6-diamide (melting point 81–82° C.) is obtained from 1 mol of hexane-1.6-diisocyanate and 2 mols of sodium aceto-acetic acid ester in ethereal suspension, this operation being followed by an acid aftertreatment of the intermediately formed sodium compound.

Example 4

25 parts of benzylcellulose (54% benzyl) are dissolved in a mixture of 30 parts of benzene and 35 parts of tetrahydrofurane. Then 2.5 parts of the diisocyanate derivative as described in Example 1, dissolved in 5 parts of tetrahydrofurane, are added. The mixture is spun according to the methods described in the foregoing examples.

Example 5

8 parts of a reaction mixture obtained by causing to react 1 mol of hexane-1.6-diisocyanate with 1.05 mols of m-cresol (heated for 6 hours to 100° C.) are mixed with a solution of 100 parts of cellulose acetate (acetyl content: 54.5%) in 3 parts of a mixture of 85 parts of acetone and 15 parts of alcohol. The solution is spun according to the dry-spinning process. The threads, when heated for 2 hours to 140–150° C., lose their solubility in acetone and other solvents for cellulose acetate. The cresol being split off during reaction is removed by an aftertreatment with a 0.3% soap solution at 60–70° C.

We claim:

1. In the dry-spinning of a secondary cellulose acetate the improvement which comprises dissolving within the cellulose acetate solution prior to the spinning thereof a product of the addition of 1 mol of a diisocyanate with 2 mols of a malonic acid ester and exposing the spun materials prepared therefrom to a temperature at which reaction between the cellulose acetate and the said addition product occurs.

2. In the spinning of solutions in organic solvents of cellulose derivatives containing free hydroxyl groups, the improvement which comprises incorporating in such solutions prior to the spinning thereof, a diisocyanate derivative selected from the class consisting of those of the following formulae:

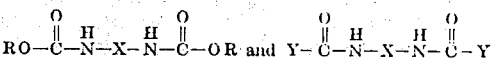

wherein X is selected from the class consisting of alkylene and arylene, R is selected from the class consisting of aryl and ethenyl alkyl, and Y represents the radicle of an organic compound containing an activated methylene group, and subjecting the material after the spinning thereof, to a temperature at which reaction between the cellulose derivative and the diisocyanate derivative occurs.

3. The process as defined in claim 2 wherein the cellulose derivative is a cellulose ester.

4. The process as defined in claim 6 wherein the materials after spinning are subjected to a temperature of between about 150 and 160° C.

5. The process as defined in claim 2 wherein X is an alkylene radicle containing at least 4 carbon atoms.

6. The process as defined in claim 2 wherein X is a phenyl radicle.

7. In the spinning of solutions in organic solvents of cellulose derivatives containing free hydroxyl groups, the improvement which comprises incorporating in said solutions prior to the spinning thereof a diisocyanate derivative consisting of a product of the addition of 1 mol of a diisocyanate and 2 mols of an organic compound containing an activated methylene group, and subjecting the materials after the spinning thereof, to a temperature at which reaction between the cellulose derivative and the diisocyanate derivative occurs.

8. The process as defined in claim 7 wherein the diisocyanate derivative is a product of the addition of 1 mol of a diisocyanate and 2 mols of a malonic-acid ester.

9. The process as defined in claim 7 wherein the diisocyanate derivative is a product of the addition of 1 mol of an aliphatic diisocyanate and 2 mols of a malonic acid ester.

10. The process as defined in claim 2 wherein the solution is spun according to the dry-spinning process and wherein the temperature to which the composition is subjected after leaving the spinning nozzle is sufficient to effect evaporation of the solvent and reaction between the cellulose derivative and the diisocyanate derivative.

11. The process as defined in claim 2 wherein the spinning is effected according to the dry-spinning process and the material after leaving the spinning nozzle is subjected to a temperature of about 150 to about 160° C.

12. The process as defined in claim 2 wherein the spinning is effected according to the dry-spinning process and wherein the cellulose derivative is a cellulose ester.

SIEGFRIED PETERSEN.
PAUL SCHLACK.